Oct. 9, 1951            C. D. BEETH            2,570,308
AUTOMATIC CHUCK FOR PULL-DOWN DEVICES
Original Filed Feb. 1, 1943            2 Sheets—Sheet 1
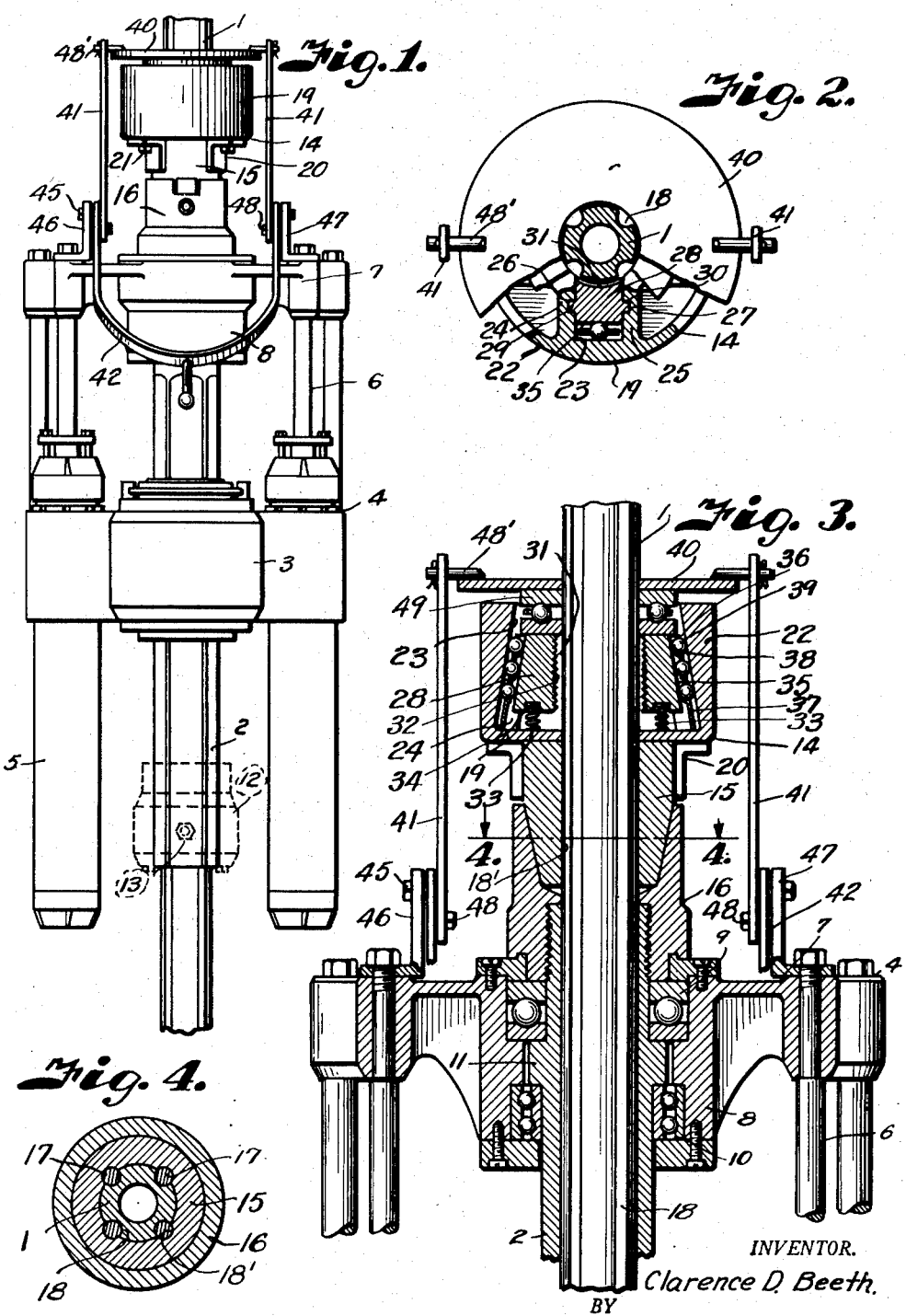
INVENTOR.
Clarence D. Beeth.
BY
Fishburn & Mullendore
ATTORNEYS.

Oct. 9, 1951     C. D. BEETH     2,570,308
AUTOMATIC CHUCK FOR PULL-DOWN DEVICES
Original Filed Feb. 1, 1943     2 Sheets-Sheet 2
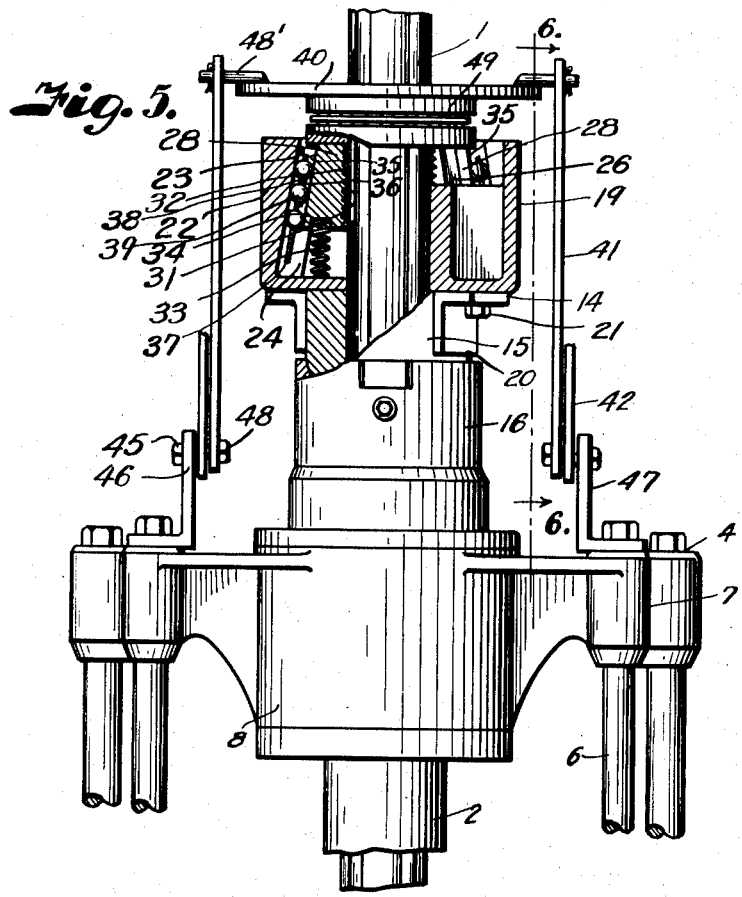
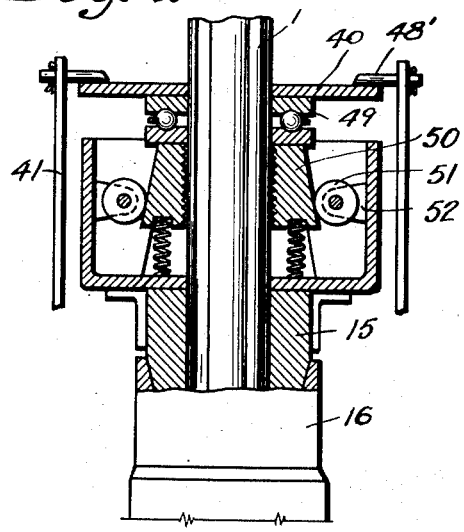
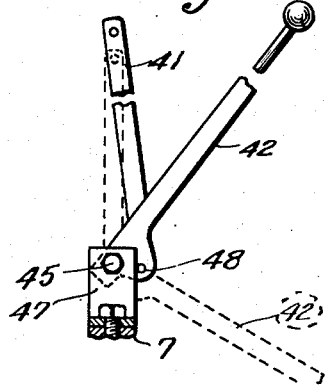
INVENTOR.
Clarence D. Beeth
BY
Fishburn & Mullendore
ATTORNEYS Patented Oct. 9, 1951

2,570,308

UNITED STATES PATENT OFFICE 2,570,308

AUTOMATIC CHUCK FOR PULLDOWN DEVICES

Clarence D. Beeth, Houston, Tex., assignor to Continental Oil Company, Ponca City, Okla., a corporation of Delaware Original application February 1, 1943, Serial No. 474,259. Divided and this application January 28, 1946, Serial No. 643,913

4 Claims. (Cl. 255—22)

This invention relates to automatic chucks such as used in rotary drilling equipment for connecting a pull-down mechanism with the drill pipe during drilling operations, the present invention being directed to species of the invention originally disclosed in my co-pending application on "Pull-Down Device," Serial No. 474,259, filed February 1, 1943, and which resulted in Patent No. 2,393,603, issued January 29, 1946.

When drilling a well with rotary equipment, a string of drill pipe carrying the drill bit on the lower end thereof is suspended from a kelly or drive rod to which a rotating power is applied. It is desirable when drilling certain formations to apply downward pressure on the drill bit so as to effect proper operation and drilling speed of the bit. This is usually effected by pull-down mechanism adapted to be connected with the kelly by means of a chuck rotatable with the Kelly rotating mechanism. Pull-down units and particularly those of the hydraulic type have limited movement and the drilling mechanism must be stopped and the chuck loosened after each downstroke to permit readjustment of the pull-down unit, after which the chuck is retightened at an upper point on the Kelly rod and the drilling mechanism again set in operation. These operations are continued until the drilling has progressed to the point where the upper end of the Kelly rod approaches the limit of its movement with respect to the pull-down unit. It is then necessary to release the chuck and withdraw the kelly for inserting an additional string of drill pipe.

Disconnecting of the chuck is a tedious, time-consuming and expensive task and results in slowing down of the drilling time. It is, therefore, the purpose of the present invention to provide an automatic chuck to avoid the necessity of shutting down the drill rotating mechanism and manual manipulation of the chuck.

Other objects of the invention are to provide an automatic chuck that is of simple and inexpensive construction and which operates efficiently under drilling conditions.

In accomplishing these and other objects of the invention hereinafter pointed out, I have provided improved structure, the preferred form of which is illustrated in the accompanying drawings wherein:

Fig. 1 is an elevational view of a hydraulic unit of a drilling rig coupled to a Kelly rod by an automatic chuck embodying the features of the present invention, the jaw control lever being in a position to hold the jaws out of contact with the kelly.

Fig. 2 is a top plan view of the chuck, parts being broken away and in section to better illustrate the interior construction.

Fig. 3 is a vertical section showing the chuck jaws released from gripping engagement with the Kelly rod.

Fig. 4 is a transverse sectional view through the kelly and drive bushing on the line 4—4 of Fig. 3.

Fig. 5 is a side elevational view of the upper portion of the pull-down unit with parts broken away and in section to show the jaws of the chuck in gripping engagement with the kelly.

Fig. 6 is a fragmentary vertical section on the line 6—6 of Fig. 5 and showing the jaw release lever mechanism.

Fig. 7 is a vertical section through a chuck showing a modified form of jaw backing elements.

Referring more in detail to the drawings:

I designates a Kelly rod that is connected at its lower end with a drill pipe (not shown) and has its upper end suspendedly supported from a swivel head (not shown). A drill bit (also not shown) is attached to the lower end of the drill pipe and the kelly is rotated in conventional manner by means of a drive rod 2 that is rotatably mounted in a rotating mechanism designated by the housing 3 and which is associated with a pull-down unit 4. The pull-down unit illustrated includes a pair of hydraulic cylinders 5 suspended from the housing 3 and containing vertically reciprocable piston rods 6 that are connected at their upper ends by a yoke 7. The yoke 7 has a collar 8 in which the upper end of the drive rod 2 is rotatably supported in anti-friction bearings 9 and 10, the shaft being supported from relative longitudinal movement with respect to the collar by means of a flange 11 engaged between the bearings 9 and 10 so that the drive rod is moved vertically with the yoke upon reciprocation of the piston rods while it is freely rotatable within the yoke collar and the housing 3 which contains the rotating mechanism having a sliding driving connection with the Kelly rod as in any conventional drilling rig design.

Heretofore downward pressure has been brought to bear on the Kelly rod and rotation of the kelly effected by means of chucks attached to one or the other ends of the kelly as indicated by the dotted lines designated 12 (Fig. 1) and the jaws of these chucks were manually adjusted by set screws 13; consequently, it has been necessary to stop rotation of the drilling mechanism and to loosen the set screws and rechuck after each downstroke of the pull-down unit. With the instant invention the chucks may be eliminated and power of the pull-down unit is applied to the Kelly rod by a chuck 14 embodying the features of the present invention.

Rotation is effected by means of a drive bushing 15 engaged in a drive nut 16 threaded onto the upper end of the drill rod 2 as best shown in Fig. 3. In the illustrated instance the drive bushing 15 is shown as connected with the Kelly rod by keys 17 carried in grooves 18' of the bushing and slidable within longitudinal ways 18 of the Kelly rod. The chuck 14 includes a case 19 secured to the drive bushing 15 by means of angles 20 attached to the bushing and to the case by fastening devices such as bolts 21. Consequently, the case 19 is reciprocably and rotatably movable with the drive rod.

The case 19 includes a wall 22 having a plurality of upwardly and inwardly inclined ways 23 located intermediate inwardly extending wings 24 and 25. The wings 24 and 25 have facing grooves 26 and 27 (Fig. 2) on their inner faces corresponding to the angle of inclination of the faces 23. Slidably mounted between each pair of wings is a jaw 28 of a width to be loosely contained between the wings and having projections 29 and 30 on sides thereof engaged within the grooves 26 and 27. The inner faces 31 of the jaws conform to the shape of the kelly and are provided with teeth 32 adapted to engage the kelly when the jaws are moved to the upper portion of the ways by coil springs 33 seated on the bottom of the case and having ends bearing in sockets 34 formed in the lower ends of the jaws. The outer linear faces 35 of the jaws are thus kept in substantial parallel alignment with linear faces of the inclined ways 23 and are backed by anti-friction devices 36, each including a plate-like retainer 37 having openings 38 for mounting balls 39 therein and which are adapted for rolling movement on the linear faces of the ways and on the linear outer faces of the jaws as the jaws are caused to move within the ways as later described.

With the jaws in the position shown in Fig. 5, the pull-down unit is positively coupled with the Kelly rod 1. As the piston rods of the pull-down unit move downwardly a downward pressure is exerted upon the Kelly rod 1 and drill pipe through the medium of the yoke 7, drive nut 16, drive bushing 15, case 19, anti-friction devices 36, and jaws 28. Because of the inclined arrangement of the ways 23, the gripping action of the jaws increases as the pressure of the pull-down unit increases. During operation of the pull-down unit, the drill pipe rotating mechanism continuously rotates the drive rod 2, drive nut 16, and drive bushing 15 to rotate the Kelly rod by reason of its keyed connection with the bushing.

When the piston rods 6 of the pull-down unit reach the bottom of their stroke, direction of travel is reversed and as the yoke 7 is raised it lifts the drive rod 2, drive nut 16, drive bushing 15 and case 19. As the case 19 moves upwardly relative to the Kelly rod 1, the balls 39 of the anti-friction devices roll in the ways 23 to slack off pressure against the jaws 28, thereby releasing connection of the pull-down unit with the Kelly rod. When the upper limit of the stroke is reached, the pull-down unit again reverses its direction of travel and the springs 33 are effective in cooperation with the inclined ways to cause the jaws to grip the Kelly rod and again couple the pull-down unit therewith.

Occassionally, it is desirable to hold the jaws 28 away from the Kelly rod 1 for a considerable length of time and for this purpose, a special releasing mechanism is provided. This mechanism constitutes a circular plate 40 located above the case 19 and which is raised and lowered by links 41. A manually operated release lever 42 is attached to the lower ends of the links 41. The lever 42 is pivoted as at 45 to brackets 46 and at 47 and is connected with the links 41 by pivots 48. The upper ends of the links are connected with pins 48' fixed to and projecting from the periphery of the plate.

When the release control lever is in raised position as shown in full lines, Fig. 6, the plate 40 is raised permitting the jaws 28 to engage the Kelly rod.

When the release control lever is lowered to the dotted line position shown in Fig. 6, and in full lines in Fig. 1, the plate is lowered to the position shown in Fig. 3 so that an anti-friction bearing 49 on the underside of the plate presses against the upper ends of the jaws 28 urging them down and away from the Kelly rod. In this position of the release control lever 42, the pull-down unit is released from the kelly until such a time that the release control lever is raised.

In the modified form of the invention shown in Fig. 7, the construction is substantially the same with the exception that the inclined ways in the case are omitted and the jaws 50 are backed by rollers 51 carried by brackets 52 extending inwardly from the wall of the case.

From the foregoing it is obvious that I have provided an automatic chuck which is of simple and inexpensive construction and which operates without making it necessary to stop operation of the rotating mechanism.

What I claim and desire to secure by Letters Patent is:

1. An automatic chuck for pull-down devices including a case having means adapted for connection of the case with a pulldown device, said case having an axial passageway for a member to be gripped and having spaced bearing faces spaced circumferentially about the passageway and inclined outwardly relative to the axis of said passageway and in the direction of said connection means, jaws having correspondingly inclined bearing faces, backing members having rolling contact with the inclined bearing faces of the jaws and with the correspondingly inclined faces of the case, guide means supporting the jaws in the case for movement to and from said axis in directions substantially parallel with said bearing faces, springs between the jaws and case for moving the jaws in one direction to grip said member, and means for moving the jaws in opposition to said springs for releasing the jaws.

2. An automatic chuck for pull-down devices including a case having an axial passageway for a member to be gripped and having bearing faces spaced circumferentially about the passageway and inclined relative to the axis of said passageway, jaws having inclined bearing faces corresponding in inclination to the inclination of the bearing faces of the case, a series of spaced rotary members for backing each jaw having rolling contact with the inclined faces of the jaws and with the corresponding inclined faces of the case, spacing means for retaining the individual rotatable backing members of the respective series in spaced relation, guide means supporting the jaws in the case for movement to and from said axis in directions substantially parallel with said faces, springs between the jaws and case for moving the jaws in one direction to grip said member, and means for moving the jaws in opposition to said springs for releasing the jaws.

3. An automatic chuck for pull-down devices including a case having an axial passageway for a member to be gripped and having spaced bearing faces spaced circumferentially about the passageway and inclined relative to the axis of said passageway, jaws having inclined bearing faces corresponding in inclination with the inclination of the bearing faces of the case, backing members having rolling contact with the inclined faces of the jaws and with the correspondingly inclined faces of the case, guide means supporting the jaws in the case for movement to and from said axis in directions substantially parallel with said faces, springs between the jaws and case for moving the jaws in one direction to grip said member, an anti-friction bearing race encircling the passageway and supported on the jaws, and means shifting said bearing ring for moving the jaws in opposition to said springs for releasing the jaws.

4. In an apparatus of the character described, a rotary drive bushing having longitudinal grooves and keys in said groove adapted to engage the grooves of a grooved Kelly rod, a case having a passageway coaxial with the drive bushing to accommodate the Kelly rod, means rigidly connecting the case with the drive bushing to prevent relative rotation therebetween, said case having inclined bearing faces arranged in intermediate relation with the respective grooves of the drive bushing, jaws adapted to grip portions of the Kelly rod intermediate the grooves of the Kelly rod, said jaws having inclined bearing faces corresponding with the respective inclined bearing faces of the case, backing members having rolling contact with the inclined faces of the jaws and with the inclined faces of the case, guide means supporting the jaws in the case for movement to and from said axis in directions substantially parallel with said inclined faces, springs between the case and jaws to move the jaws in one direction to effect gripping thereof, and means for moving the jaws against action of the springs to release said jaws.

CLARENCE D. BEETH.

REFERENCES CITED

The following references are of record in the file of this patent:

UNITED STATES PATENTS

| Number | Name | Date |
|---|---|---|
| 1,094,972 | Bocorselski | Apr. 28, 1914 |
| 1,196,033 | Schmuck | Aug. 29, 1916 |
| 1,690,469 | Whinnen | Nov. 6, 1928 |
| 1,718,998 | Carroll | July 2, 1929 |
| 1,811,939 | Johansen | June 30, 1931 |
| 1,904,256 | Sheldon | Apr. 18, 1933 |
| 2,114,305 | Johansen | Apr. 19, 1938 |
| 2,393,603 | Beeth | Jan. 29, 1946 |